United States Patent
Salenbien et al.

(10) Patent No.: US 9,469,225 B1
(45) Date of Patent: Oct. 18, 2016

(54) CENTER ARMREST INERTIAL LOCK

(71) Applicant: FORD GLOBAL TECHNOLOGIES, LLC, Dearborn, MI (US)

(72) Inventors: Nicholas Salenbien, Dundee, MI (US); Thomas J. Susko, Saint Clair Shores, MI (US); Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/676,203

(22) Filed: Apr. 1, 2015

(51) Int. Cl.
*B60N 2/46* (2006.01)
*B60N 2/44* (2006.01)

(52) U.S. Cl.
CPC ........... *B60N 2/4613* (2013.01); *B60N 2/4435* (2013.01); *B60N 2002/4455* (2013.01)

(58) Field of Classification Search
CPC ...... B60N 2/43; B60N 2/433; B60N 2/4606; B60N 2/4613; B60N 2/4633; B60N 2/427; B60N 2/4435; B60N 2002/4455
See application file for complete search history.

(56) References Cited

U.S. PATENT DOCUMENTS

| | | | |
|---|---|---|---|
| 3,168,346 A | 2/1965 | Rei, Jr. | |
| 4,579,384 A * | 4/1986 | Sharod | B60N 2/4606 297/113 |
| 5,100,202 A * | 3/1992 | Hughes | B60N 2/433 297/378.11 |
| 5,476,307 A * | 12/1995 | Whalen | B60N 2/4606 297/378.11 |
| 5,658,043 A * | 8/1997 | Davidson | B60N 2/4606 297/113 |
| 5,873,633 A * | 2/1999 | Lang | B60N 2/3084 297/411.2 |
| 6,742,845 B2 * | 6/2004 | Nock | B60N 2/2352 297/378.11 |
| 2008/0129101 A1 | 6/2008 | Park | |
| 2010/0244502 A1 | 9/2010 | Andersson et al. | |
| 2014/0125107 A1 | 5/2014 | Cha et al. | |
| 2014/0319868 A1 * | 10/2014 | von Rothkirch und Panthen | B60N 2/4633 296/24.34 |

FOREIGN PATENT DOCUMENTS

| | | |
|---|---|---|
| DE | 3825781 A1 | 2/1990 |
| EP | 0518358 A1 | 12/1992 |

OTHER PUBLICATIONS

English machine translation for DE3825781.

* cited by examiner

*Primary Examiner* — Philip Gabler
(74) *Attorney, Agent, or Firm* — Vinchit Chea; King and Schickli PLLC

(57) ABSTRACT

An inertial lock assembly for a vehicle armrest includes a stopping member disposed on an armrest attachment bracket and a catch pin for engaging the stopping member. The catch pin is disposed on an armrest link journaled at one end to the attachment bracket and at an opposed end to an armrest frame. The stopping member pivots to engage the catch pin. A guide pin disposed on the armrest attachment bracket is configured to slide within an arcuate guide slot in the stopping member, to restrict a range of pivoting movement of the stopping member. A stop disposed on the armrest link is configured to bias an end of the arcuate guide slot against the guide pin when the armrest attachment bracket and armrest link are in a stowed configuration or in a fully deployed configuration. Armrest and seat assemblies including the inertial lock assembly are described.

14 Claims, 8 Drawing Sheets

CENTER ARMREST INERTIAL LOCK

TECHNICAL FIELD

This disclosure relates generally to seats for motor vehicles, and more particularly to a locking mechanism for a seat center armrest.

BACKGROUND

Center seat armrests are well known in the art, and are used particularly with motor vehicle bench-type seats. The center seat armrest, as the name implies, provides a convenient place in a center portion of a seat for a passenger to rest his or her arm. Moreover, center seat armrests may be equipped with a variety of useful and convenient features such as storage bins, cup holders, and the like. Typically, a center seat armrest is configured to pivot, allowing the armrest to be translated between a stowed configuration (usually at least partially or fully nested within a recess in the vehicle seat back whereby a seat back for a passenger is provided) and a deployed, substantially horizontal configuration for use by adjacent passengers.

To deploy the armrest, usually it is necessary only to grasp the armrest or a handle attached to the armrest and pull forward. That is, for convenience the user typically does not have to actuate a dedicated locking/unlocking mechanism in order to use the armrest. Instead, a friction fit between the armrest and a receiver defined in the seat back is most often relied on to keep the armrest in a stowed configuration. However, while convenient, this admits of inadvertent and undesired deployment of the armrest. For example, this could be caused by vehicle deceleration created by a frontal impact to the vehicle, causing an otherwise unrestrained center armrest to deploy.

To solve this and other problems, the present disclosure relates to a vehicle seat center armrest inertial lock configured to retain the center armrest substantially in a stowed configuration in the event of a frontal impact to the vehicle. Advantageously, the inertial lock allows normal deployment of the center armrest by a user, without requiring the user to actuate a locking/unlocking mechanism. However, in the event of a frontal impact to the vehicle, the inertial lock prevents inadvertent and undesired deployment of the armrest caused by the forward inertial energy of the impact.

SUMMARY

In accordance with the purposes and benefits described herein, in one aspect an inertial lock assembly for a vehicle armrest is provided, the inertial lock assembly including a stopping member disposed on an armrest attachment bracket. A catch pin for engaging the stopping member is provided, the catch pin being disposed on an armrest link journaled at one end to the armrest attachment bracket and at an opposed end to an armrest frame. During a sudden vehicle deceleration, for example an acute braking operation or a frontal impact to the vehicle, the stopping member freely pivots. In embodiments, the stopping member includes an arcuate guide slot. A guide pin disposed on the armrest attachment bracket engages the arcuate guide slot, thereby restricting a range of pivoting movement of the stopping member.

The inertial lock assembly may also include a stop disposed on the armrest link. The stop is configured to bias an end of the arcuate guide slot against the guide pin when the armrest attachment bracket and armrest link are in a stowed configuration or in a fully deployed configuration. In embodiments, the stop is a bar attached to the armrest link and having a pair of biasing members disposed at an end thereof. In alternative embodiments, the stop is provided by a pair of biasing members disposed at an end of the armrest link.

In another aspect, an armrest assembly for a vehicle including the inertial lock assembly described above is provided. In yet another aspect, a seat assembly for a vehicle is provided, including the armrest assembly and the inertial lock assembly.

In the following description, there are shown and described embodiments of the disclosed vehicle seat center armrest inertial lock. As it should be realized, the inertial lock is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed vehicle seat center armrest inertial lock, and together with the description serve to explain certain principles thereof. In the drawing.

Reference will now be made in detail to embodiments of the disclosed vehicle center armrest inertial lock, examples of which are illustrated in the accompanying drawing figures.

DETAILED DESCRIPTION

Figure 1:
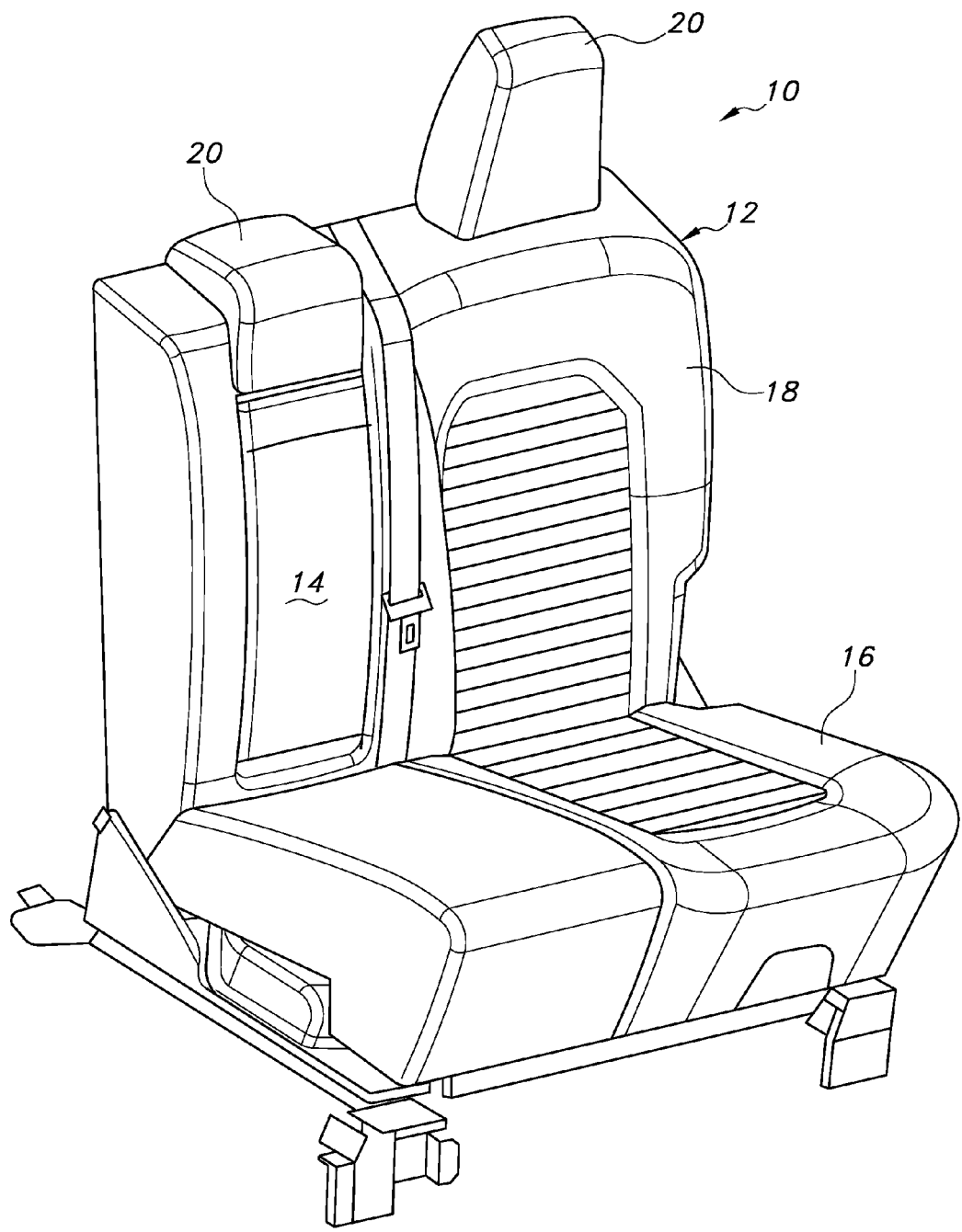
FIG. 1 depicts a portion of a vehicle bench-type seat including a center armrest.

FIG. 1 shows an exemplary seat assembly 10 for a vehicle, in the depicted embodiment being a partial view of a bench-type second row vehicle seat 12 including a pivoting 60% seat center armrest 14. The seat 12, as is well known in the art, is defined by a frame (not visible in this view) defining a seat bottom 16 having seating areas for a plurality of passengers, a seat back 18, padding for passenger comfort, a cover, and fixed or deployable headrests 20. As shown, armrest 14 is in an upright, stowed configuration within a cavity 22 defined in the seat back 18. For convenience, only a left and a center seating area of seat 12 are depicted, although as is known a right seating area will also be included in the conventional bench-type vehicle seat 10. It will be appreciated also that this embodiment is depicted for illustrative purposes only, and that the various structures and embodiments described below are equally adaptable to alternative vehicle seat types.

Figure 2:
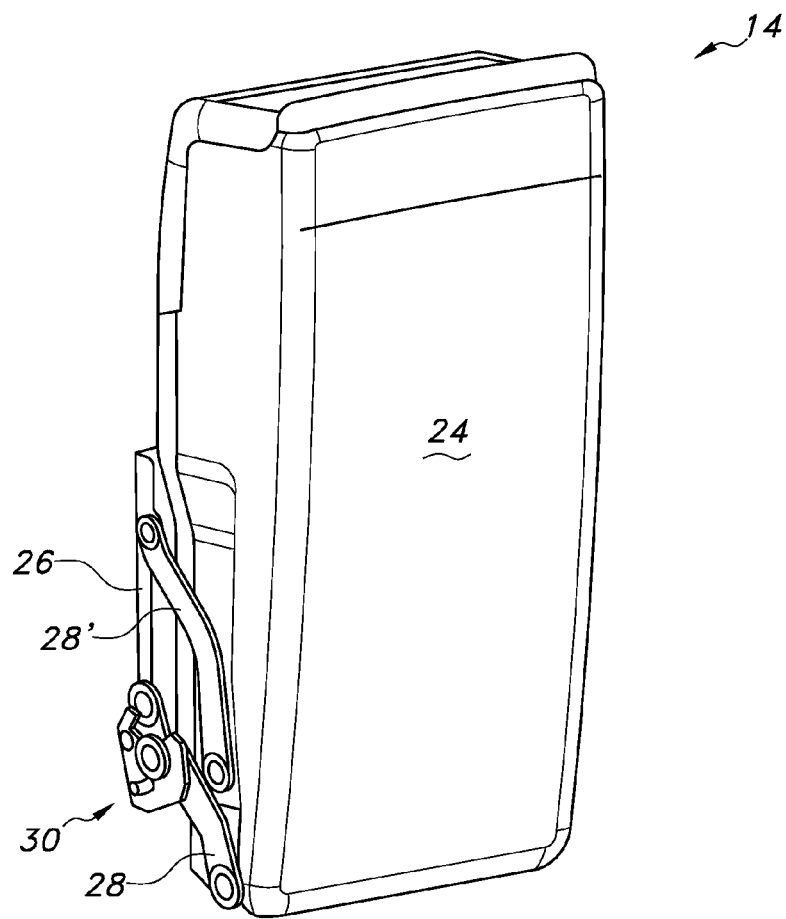
FIG. 2 shows a side perspective view of a stowed center armrest including an inertial lock according to the present disclosure.

FIG. 2 shows an isolated view of a pivoting center armrest 14 according to the present disclosure, including an armrest body 24 configured for pivoting relative to the seat back 18 (not shown in this view) for translation between an upright, stowed configuration and a fully deployed configuration for use as an armrest. An attachment bracket 26 secures the armrest body 24 to the seat frame or to a frame member of the vehicle body (not shown in this view). At least one link 28 is included, journaled at a first end to the attachment bracket 26 and at a second end to a portion of the armrest body 24. In the depicted embodiment, a lower link 28 and an upper link 28' are provided. The links 28, 28' may in embodiments be journaled to a frame member defining the armrest 14, to brackets attached to sides of the armrest body 24, or otherwise. At least one inertial lock assembly 30 is included, the structure and purpose of which will be described in greater detail below. As will be appreciated, in embodiments a single inertial lock assembly 30 may be provided. In alternative embodiments, a pair of inertial lock assemblies 30 may be provided, disposed at opposed corners of the armrest body 24.

Figure 3A:
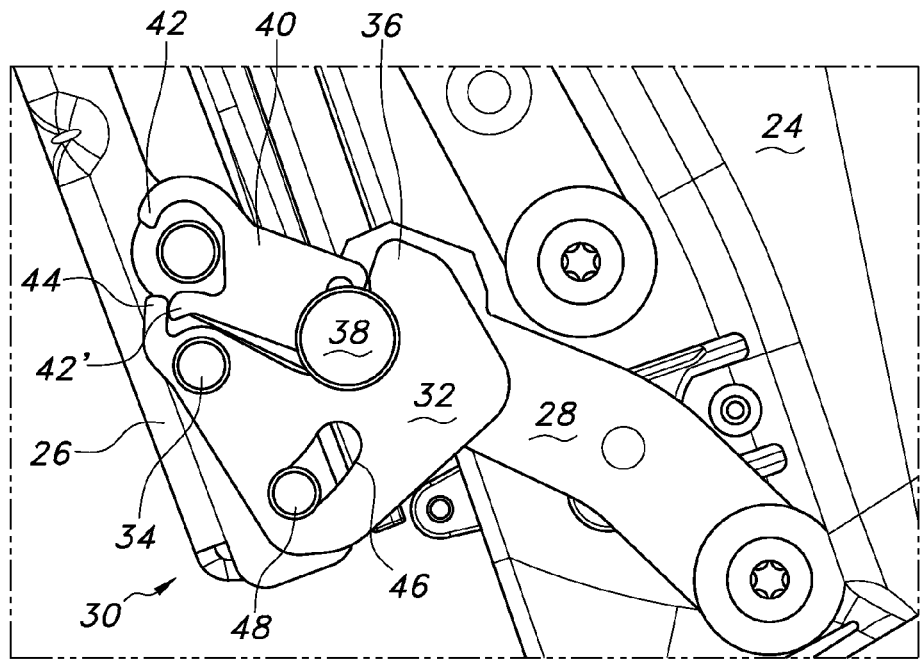
FIG. 3A is an isolated side view of the inertial lock of FIG. 2.

An inertial lock assembly 30 according to the present disclosure is shown in isolation in FIG. 3A, in the depicted embodiment being attached to an armrest body 24 held in an upright, stowed configuration. The inertial lock assembly 30 includes a pivoting stop member 32 disposed on attachment bracket 26 for freely pivoting about an axis 34. In the depicted embodiment, stopping member 32 defines a pivoting hook structure configured at an end 36 to engage a catch pin 38. A stop 40 is included, in the depicted embodiment being secured to lower link 28 and including a pair of biasing members 42, 42' configured to contact an end 44 of stopping member 32. Stopping member 32 also includes an arcuate guide slot 46 defined in a portion thereof. A guide pin 48 extending from or attached to attachment bracket 26 is configured to pass through guide slot 46. In combination, guide slot 46 and guide pin 48 restrict a range of pivoting movement of stopping member 32.

Figure 3B:
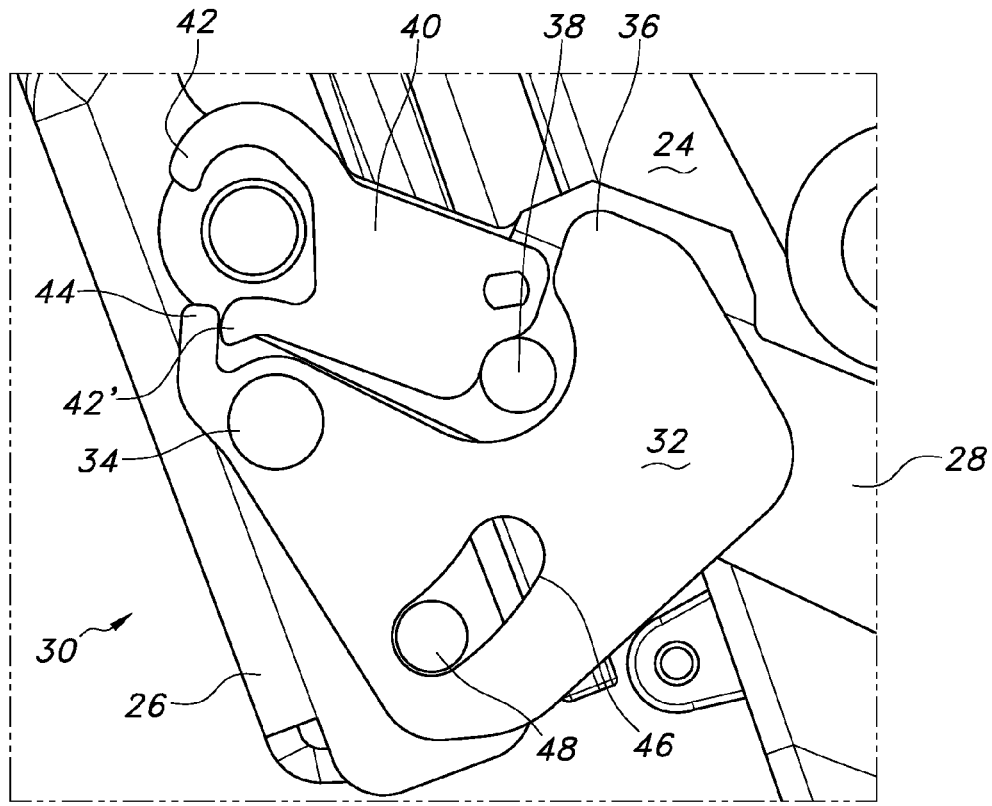
FIG. 3B shows the isolated side view of the inertial lock of FIG. 3A, with the catch pin head removed for clarity.
Figure 4A:
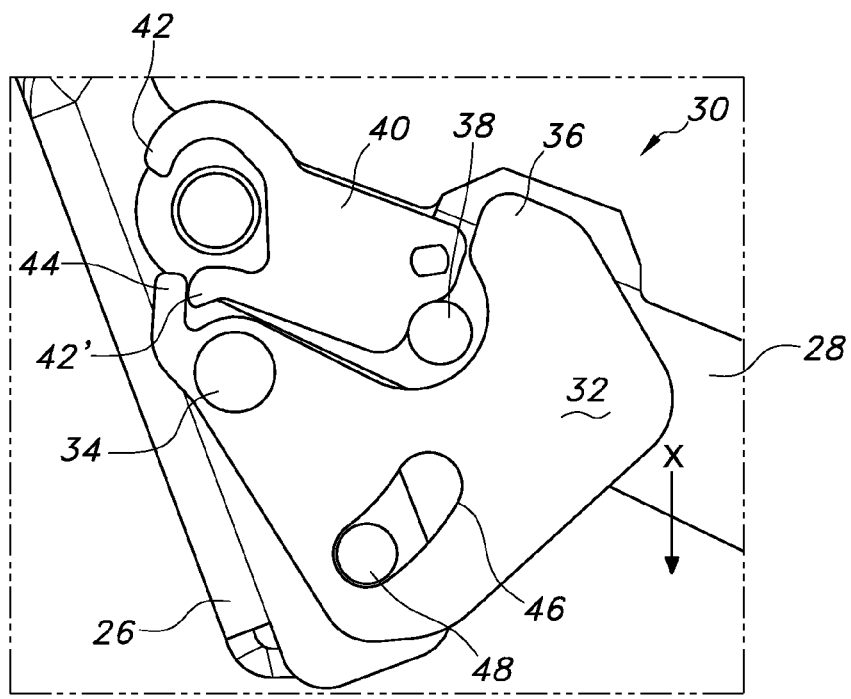
FIG. 4A shows an isolated view of an inertial lock according to the present disclosure, with the lock holding a center armrest (not shown) in a stowed configuration.
Figure 4B:
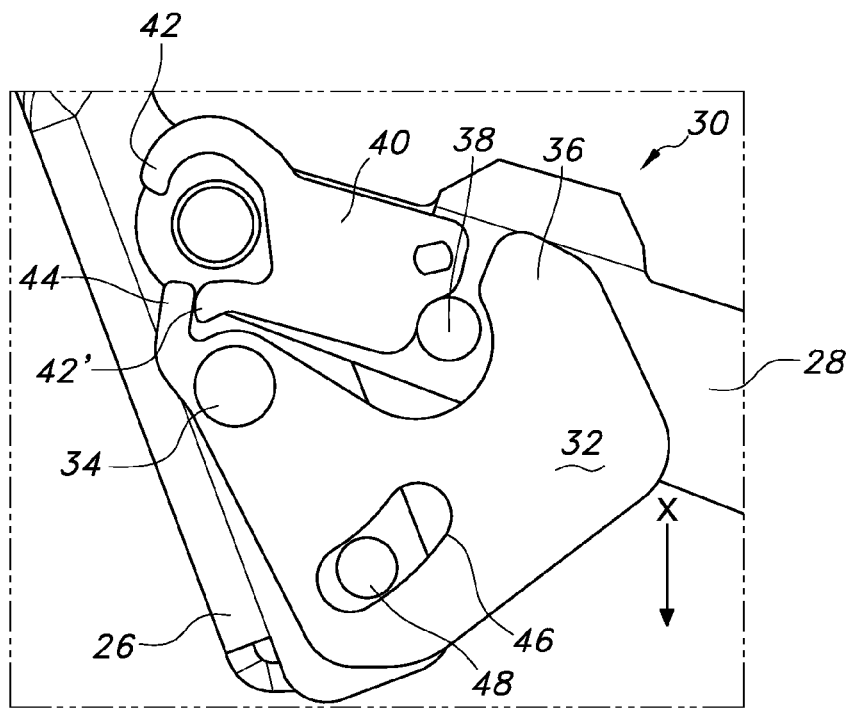
FIG. 4B shows the inertial lock of FIG. 4A beginning to deploy during normal operation.
Figure 4C:
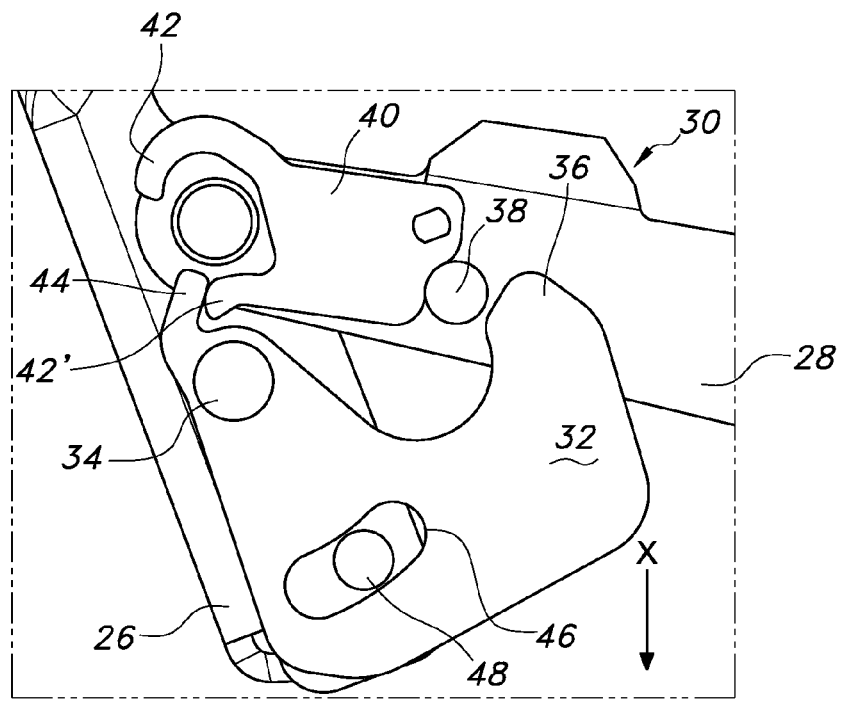
FIG. 4C shows the inertial lock of FIG. 4A continuing to deploy, with the hook bypassing the catch pin.
Figure 4D:
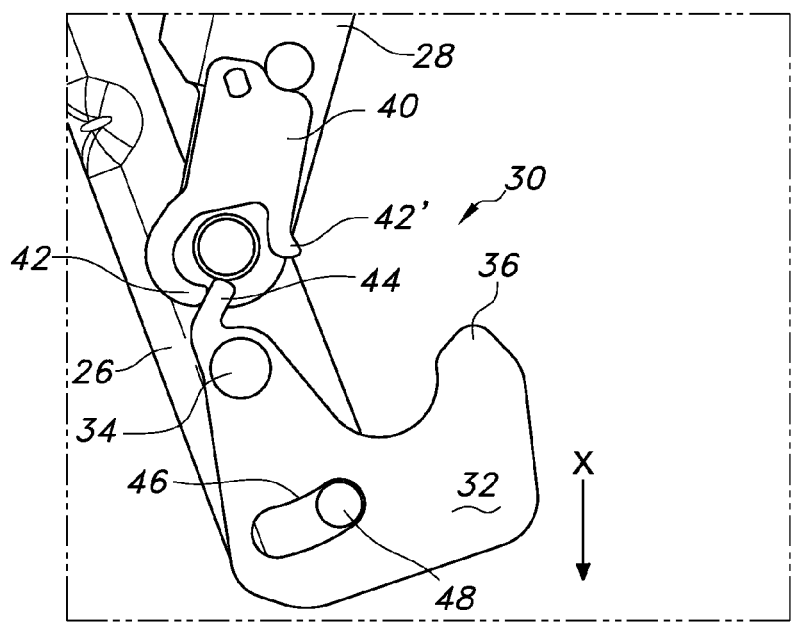
FIG. 4D shows the inertial lock of FIG. 4A, fully deployed during normal operation.

FIG. 3B shows the inertial lock assembly 30 of FIG. 3A, with the catch pin 38 head removed for clarity. In the depicted embodiment, stop 40 is attached to lower link 28 whereby when link 28 pivots, stop 40 will concurrently pivot. As shown, biasing member 42' is in contact with end 44 of stopping member 32, biasing stopping member 32 forward whereby an end of guide slot 46 is urged against guide pin 48. Likewise, on pivoting the armrest body 24 to a fully deployed configuration, link 28 and therefore stop 40 will likewise pivot, whereby biasing member 42 will contact the end 44 of stopping member 32, biasing stopping member 32 whereby an opposite guide slot 46 is urged against guide pin 48. It will be appreciated that by this structure stopping member 32 is prevented from rattling despite its configuration for freely pivoting about axis 34.

Turning now to FIGS. 4A-4D, operation of the inertial lock assembly 30 during normal deployment of an armrest (not shown), i.e. when a passenger pivots the armrest from an upright and stowed configuration (FIG. 4A) to a fully deployed configuration (FIG. 4D), will now be shown and described. As described above, in the upright and stowed configuration of FIG. 4A biasing member 42' of stop 40 is in contact with end 44 of stopping member 32, biasing stopping member 32 forward whereby guide pin 48 is urged against an end of guide slot 46. The inertial lock assembly 30 is configured whereby during normal deployment of the armrest such as by a passenger, as attachment bracket 26 and lower link 28 pivot relative to one another, stopping member 32 does not contact catch pin 38 (see FIGS. 4B and 4C) and so translation of the armrest to the fully deployed configuration (FIG. 4D) is allowed without requiring any type of specific lock release mechanism. That is, the force of gravity (see arrows) preserves the orientation of the stopping member 32, allowing the catch pin 38 to disengage from the stopping member 32.

As attachment bracket 26 and lower link 28 pivot, guide pin 48 travels through guide slot 46. Concurrently with the pivoting of lower link 28, stop 40 pivots whereby biasing member 42 contacts end 44 of stopping member 32, urging an opposed end of guide slot 48 against guide pin 46. As described above, this prevents free motion of stopping member 32 when the armrest is in the fully upright stowed configuration or in the fully deployed configuration, eliminating annoying rattling of stopping member 32 and other noise.

Figure 5:
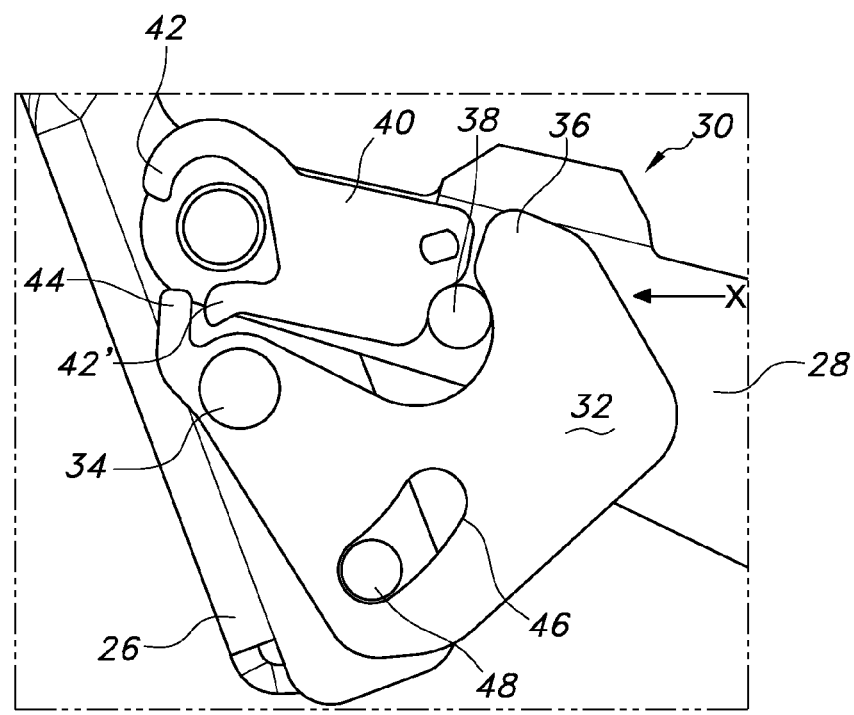
FIG. 5 shows an inertial lock according to the present disclosure, illustrating locking of the center armrest during a rapid acceleration such as following a frontal impact to the vehicle.

On the other hand, as shown in FIG. 5, in the event of a sudden vehicle deceleration such as an emergency braking action, a frontal impact to the vehicle, or the like, because the stopping member 32 is configured to freely pivot about axis 34 the effect of gravity on the stopping member 32 will be temporarily counteracted and the stopping member 32 will be urged forward by the deceleration force (see arrow) to preserve the engagement of catch pin 38. By this mechanism, deployment of the armrest during a sudden deceleration of the vehicle (in a non-limiting example a deceleration exceeding 1 G (9.81 m/s$^2$)) is prevented.

Figure 6:
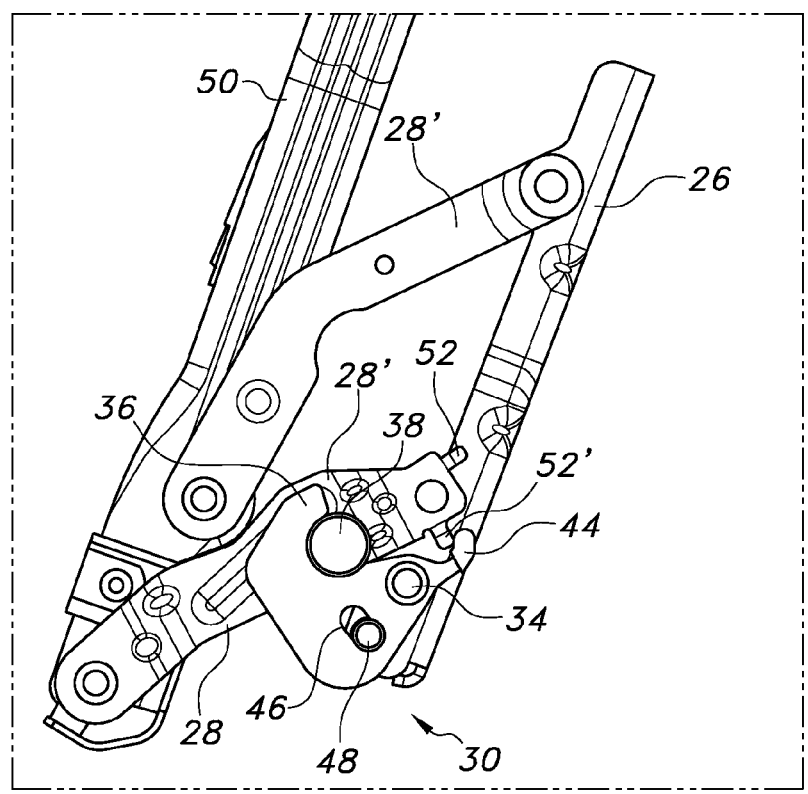
FIG. 6 shows an alternative embodiment of the inertial lock of the disclosure.
Figure 7A:
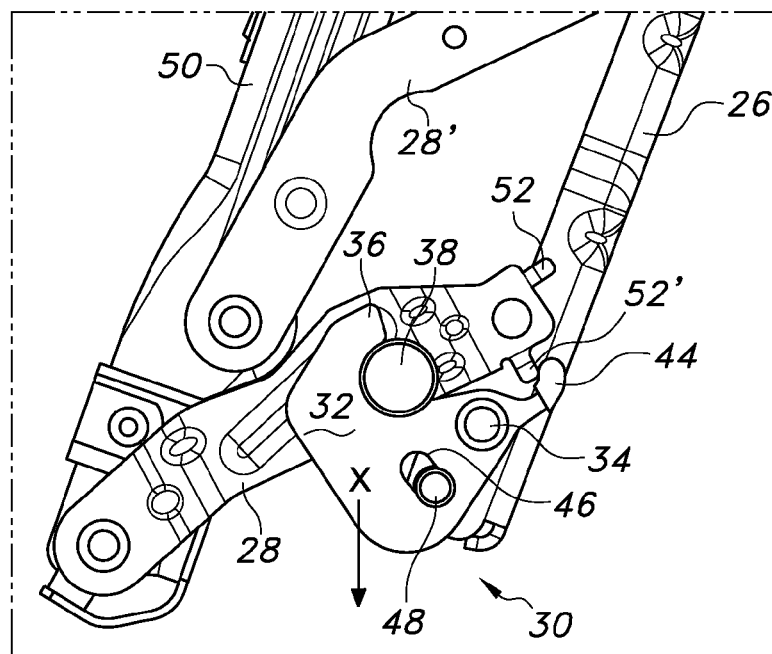
FIG. 7A shows the inertial lock of FIG. 6, beginning to deploy during normal operation.
Figure 7B:
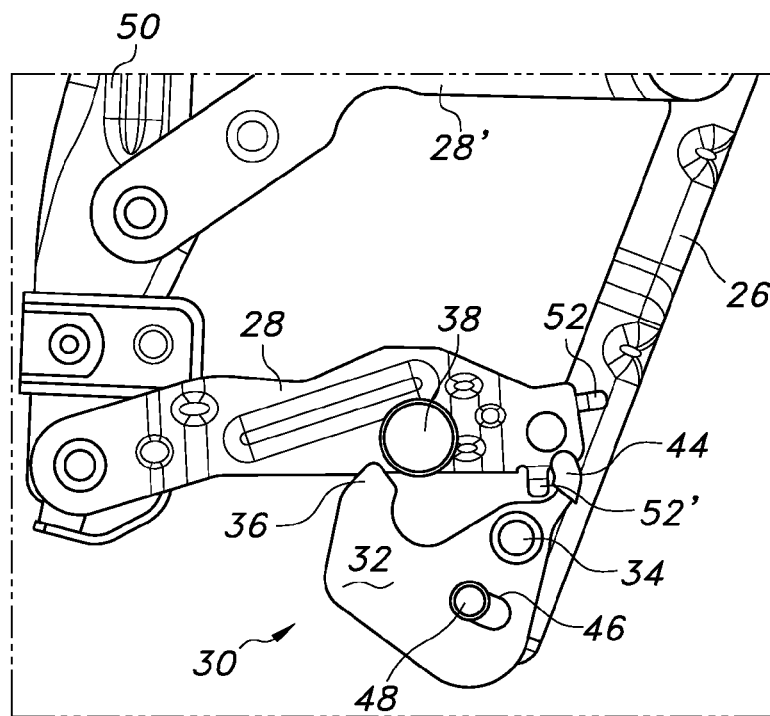
FIG. 7B shows the inertial lock of FIG. 6 fully deployed during normal operation.
Figure 8A:
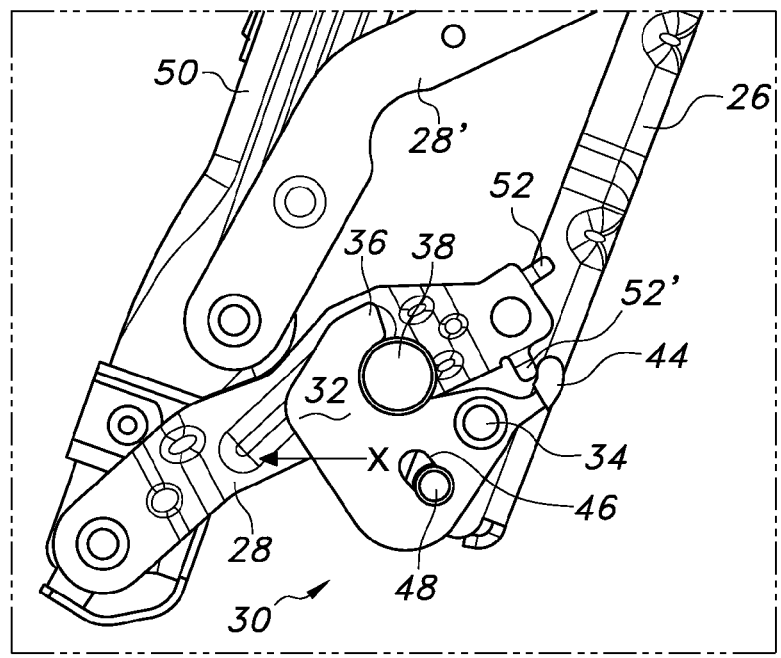
FIG. 8A shows the inertial lock of FIG. 6, illustrating locking of the center armrest during a rapid acceleration such as following a frontal impact to the vehicle.
Figure 8B:
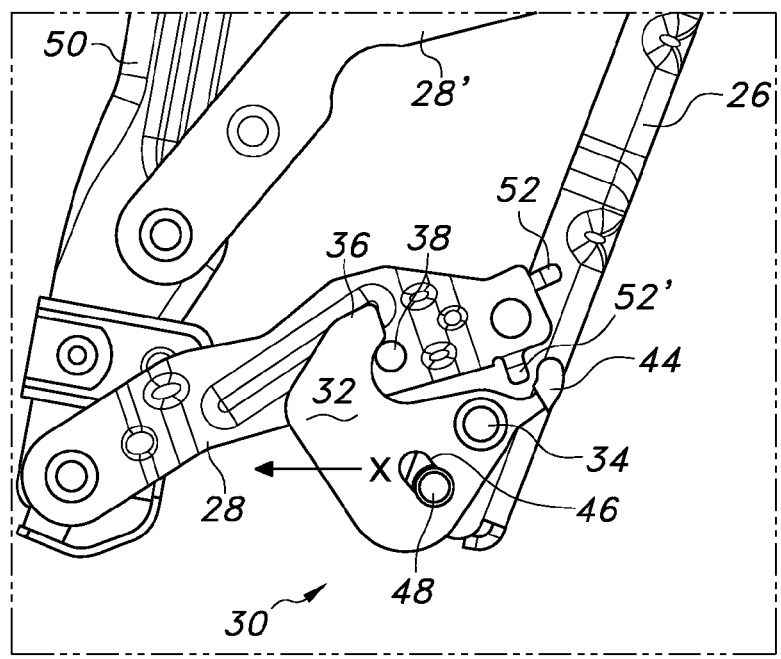
FIG. 8B shows the view of FIG. 8A with the with the catch pin head removed for clarity.

An alternative embodiment of the inertial locking assembly 30 is shown in FIG. 6. As depicted, upper link 28' and lower link 28 are journaled at a first end to an attachment bracket 26 and at a second end to an armrest frame 50. Rather than including a separate stop 40 as described above, biasing members 52, 52' are disposed on an end of lower link 28. The operation of this alternative embodiment is substantially as described above. During normal deployment of the armrest (FIGS. 7A, 7B), the force of gravity (see arrow) allows the stopping member 32 to pivot away from the catch pin 38, preventing stopping member 32 from engaging catch pin 38. On the other hand, as shown in FIGS. 8A and 8B, in the event of a sudden vehicle deceleration the freely pivoting stopping member 32 will be urged to pivot in a clockwise rotation, preserving the engagement of the stopping member 32 and the catch pin 38.

The benefits of the presently disclosed inertial locking assembly 30 are apparent. A relatively uncomplex and robust locking mechanism is provided for preventing inadvertent deployment of a center seat armrest during vehicle deceleration. The inertial locking assembly 30 allows normal deployment of the armrest by a passenger, without requiring any specific lock release mechanism is required.

Obvious modifications and variations are possible in light of the above teachings. All such modifications and variations are within the scope of the appended claims when interpreted in accordance with the breadth to which they are fairly, legally and equitably entitled.

What is claimed:

1. An inertial lock assembly for a vehicle armrest, comprising:
   a stopping member including an arcuate guide slot, said stopping member disposed on an armrest attachment bracket;
   a guide pin disposed on the armrest attachment bracket and configured to slide within the arcuate guide slot to restrict a range of pivoting movement of the stopping member; and
   a catch pin for engaging the stopping member, the catch pin being disposed on an armrest link journaled at one end to the armrest attachment bracket and at an opposed end to a portion of an armrest body;
   the stopping member freely pivoting to engage the catch pin during a vehicle deceleration.

2. The inertial lock assembly of claim 1, further including a stop disposed on the armrest link and configured to bias an end of the arcuate guide slot against the guide pin when the armrest attachment bracket and armrest link are in a stowed configuration or in a fully deployed configuration.

3. The inertial lock assembly of claim 2, wherein the stop comprises a bar attached to the armrest link and having a pair of biasing members disposed at an end thereof.

4. The inertial lock assembly of claim 2, wherein the stop comprises a pair of biasing members disposed at an end of the armrest link.

5. An armrest assembly for a vehicle, comprising:
   an armrest including at least a body, an attachment bracket for pivotally attaching the body to a seat assembly, and at least one link journaled at one end to the attachment bracket and at an opposed end to the body;
   at least one inertial lock assembly including a stopping member having an arcuate guide slot, said stopping member disposed on the attachment bracket and a catch pin for engaging the stopping member, the catch pin being disposed on the at least one link; and
   a guide pin disposed on the attachment bracket and configured to slide within the arcuate guide slot to restrict a range of pivoting movement of the stopping member,
   wherein the stopping member freely pivots to engage the catch pin during a vehicle deceleration.

6. The armrest assembly of claim 5, further including a stop disposed on the at least one link and configured to bias an end of the arcuate guide slot against the guide pin when the attachment bracket and at least one link are in a stowed configuration or in a fully deployed configuration.

7. The armrest assembly of claim 6, wherein the stop comprises a bar attached to the link and having a pair of biasing members disposed at an end thereof.

8. The armrest assembly of claim 6, wherein the stop comprises a pair of biasing members disposed at an end of the link.

9. A vehicle including the armrest assembly of claim 5.

10. A seat assembly for a vehicle, comprising:
    a seat including a seat frame, a seat bottom, and a seat back defining a recess for receiving a pivoting armrest in a stowed configuration;
    an armrest including at least a body, an attachment bracket for pivotally attaching the body to the seat frame, and at least one link journaled at one end to the attachment bracket and at an opposed end to the body;
    at least one inertial lock assembly for preventing a vehicle deceleration-induced deployment of the armrest, the inertial lock assembly including a stopping member having an arcuate guide slot, said stopping member disposed on the attachment bracket and a catch pin for engaging the stopping member disposed on the at least one link; and
    a guide pin disposed on the attachment bracket and configured to slide within the arcuate guide slot to restrict a range of pivoting movement of the stopping member,
    wherein the stopping member freely pivots to engage the catch pin during a vehicle deceleration.

11. The seat assembly of claim 10, further including a stop disposed on the at least one link and configured to bias an end of the arcuate guide slot against the guide pin when the attachment bracket and at least one link are in a stowed configuration or in a fully deployed configuration.

12. The seat assembly of claim 11, wherein the stop comprises a bar attached to the at least one link and having a pair of biasing members disposed at an end thereof.

13. The seat assembly of claim 11, wherein the stop comprises a pair of biasing members disposed at an end of the at least one link.

14. A vehicle including the seat assembly of claim 10.

* * * * *